(12) United States Patent
Stallmann (10) Patent No.: US 9,132,376 B2
(45) Date of Patent: Sep. 15, 2015

(54) METHOD OF CLEANING A CARBON DIOXIDE CONTAINING GAS, AND A CARBON DIOXIDE PURIFICATION SYSTEM

(71) Applicant: ALSTOM Technology Ltd, Baden (CH)

(72) Inventor: Olaf Stallmann, Essenheim (DE)

(73) Assignee: ALSTOM Technology Ltd, Baden (CH)

( * ) Notice: Subject to any disclaimer, the term of this patent is extended or adjusted under 35 U.S.C. 154(b) by 4 days.

(21) Appl. No.: 13/940,377

(22) Filed: Jul. 12, 2013

(65) Prior Publication Data

US 2013/0291722 A1 Nov. 7, 2013

Related U.S. Application Data

(63) Continuation of application No. PCT/IB2012/000037, filed on Jan. 13, 2012.

(30) Foreign Application Priority Data

Jan. 14, 2011 (EP) ..................................... 11150940

(51) Int. Cl.
*B01D 53/04* (2006.01)
*B01D 53/00* (2006.01)
(Continued)

(52) U.S. Cl.
CPC .......... *B01D 53/0438* (2013.01); *B01D 53/002* (2013.01); *B01D 53/75* (2013.01);
(Continued)

(58) Field of Classification Search
CPC ..................... B01D 2256/22; B01D 2257/504; B01D 2257/602; B01D 2257/80; B01D 2259/4009; B01D 53/002; B01D 53/04; B01D 53/0438; B01D 53/75; F23J 15/006; F23J 15/06; F23J 2215/50; F23J 2215/60; F23J 2219/60; F25J 2200/02; F25J 2205/60; F25J 2210/70; F25J 2215/04; F25J 2220/80; F25J 2220/82; F25J 2230/30; F25J 3/0266; F25J 3/067; Y02C 10/12; Y02E 20/363
See application file for complete search history.

(56) References Cited

U.S. PATENT DOCUMENTS

| 5,120,515 A | 6/1992 | Audeh et al. |
| 5,190,908 A | 3/1993 | Audeh et al. |

(Continued)

FOREIGN PATENT DOCUMENTS

| CN | 101231130 | 7/2008 |
| EP | 1 790 614 | 5/2007 |

(Continued)

OTHER PUBLICATIONS

Tamman, G. & Krige, G. J. (1925): "*Equilibrium pressures of gas hydrates*" Zeit. Anorg. und Algem. Chem., 146, pp. 179-195.

(Continued)

*Primary Examiner* — Christopher P Jones (57) ABSTRACT

A gas purification system for cleaning a carbon dioxide rich flue gas generated in a boiler combusting a fuel in the presence of a gas containing oxygen. The gas purification system includes a compressor for compressing the carbon dioxide rich flue gas, a first gas cooler for cooling the compressed carbon dioxide rich flue gas, a mercury adsorber arranged downstream of the first gas cooler for removing at least a portion of a mercury content of the cooled compressed carbon dioxide rich flue gas, a second gas cooler arranged downstream of the mercury adsorber for further cooling the compressed carbon dioxide rich flue gas, and a gas drier for removing at least a portion of a water content of the further cooled compressed carbon dioxide rich flue gas.

12 Claims, 4 Drawing Sheets

(51) Int. Cl.
  *B01D 53/75* (2006.01)
  *F23J 15/00* (2006.01)
  *F23J 15/06* (2006.01)
  *F25J 3/06* (2006.01)
  *F25J 3/02* (2006.01)

(52) U.S. Cl.
  CPC ............... *F23J 15/006* (2013.01); *F23J 15/06* (2013.01); *F25J 3/0266* (2013.01); *F25J 3/067* (2013.01); *B01D 53/04* (2013.01); *B01D 2256/22* (2013.01); *B01D 2257/504* (2013.01); *B01D 2257/602* (2013.01); *B01D 2257/80* (2013.01); *B01D 2259/4009* (2013.01); *F23J 2215/50* (2013.01); *F23J 2215/60* (2013.01); *F23J 2219/60* (2013.01); *F25J 2200/02* (2013.01); *F25J 2205/60* (2013.01); *F25J 2210/70* (2013.01); *F25J 2215/04* (2013.01); *F25J 2220/80* (2013.01); *F25J 2220/82* (2013.01); *F25J 2230/30* (2013.01); *Y02C 10/12* (2013.01); *Y02E 20/363* (2013.01)

(56) References Cited

U.S. PATENT DOCUMENTS

| | | |
|---|---|---|
| 5,322,628 A | 6/1994 | Yan |
| 2004/0244657 A1 | 12/2004 | Srinivasachar et al. |
| 2007/0122328 A1* | 5/2007 | Allam et al. .................. 423/235 |
| 2008/0173584 A1 | 7/2008 | White et al. |
| 2008/0250715 A1 | 10/2008 | Cooper et al. |
| 2010/0215566 A1 | 8/2010 | Lourenco et al. |
| 2010/0263529 A1 | 10/2010 | Alban et al. |

FOREIGN PATENT DOCUMENTS

| | | |
|---|---|---|
| JP | 7157305 | 6/1995 |
| WO | 2009/080994 | 7/2009 |
| WO | 2010/021053 | 2/2010 |

OTHER PUBLICATIONS

Office action issued from Chinese Patent Office dated Dec. 15, 2014 for CN Application No. 201280013269.2.

* cited by examiner

METHOD OF CLEANING A CARBON DIOXIDE CONTAINING GAS, AND A CARBON DIOXIDE PURIFICATION SYSTEM

CROSS-REFERENCES TO RELATED APPLICATIONS

This application claims priority to PCT/IB2012/000037 filed Jan. 13, 2012, which claims priority to European Application 11150940.2 filed Jan. 14, 2011, both of which are hereby incorporated in their entireties.

TECHNICAL FIELD

The present invention relates to a method of cleaning a carbon dioxide rich gas generated in a boiler combusting a fuel in the presence of a gas containing oxygen gas.

The present invention further relates to a gas purification system for cleaning a carbon dioxide rich gas generated in a boiler system comprising a boiler for combusting a fuel in the presence of a gas containing oxygen gas.

BACKGROUND

In the combustion of a fuel, such as coal, oil, peat, waste, etc., in a combustion plant, such as a power plant, a hot process gas is generated, such process gas containing, among other components, carbon dioxide $CO_2$. With increasing environmental demands various processes for removing carbon dioxide from the process gas have been developed. One such process is the so called oxy-fuel process. In an oxy-fuel process a fuel, such as one of the fuels mentioned above, is combusted in the presence of a nitrogen-lean gas. Oxygen gas, which is provided by an oxygen source, is supplied to a boiler in which the oxygen gas oxidizes the fuel. In the oxy-fuel combustion process a carbon dioxide rich flue gas is produced, which can be disposed of in order to reduce the emission of carbon dioxide into the atmosphere.

Prior to being disposed of, it is necessary to clean the carbon dioxide gas. WO 2010/021053 discloses a gas cleaning system in which a hot process gas generated in a boiler is subjected to removal of nitrogen oxides, dust, and sulphur dioxide. The hot process gas, being a carbon dioxide rich gas, is then subjected to a mercury removal step to clean the carbon dioxide rich gas prior to the disposal thereof.

SUMMARY

An object of the present invention is to provide a method of cleaning a carbon dioxide rich flue gas generated in a boiler combusting a fuel in the presence of a gas containing oxygen gas, the method being more efficient than the prior art method.

This object is achieved by means of a method of cleaning a carbon dioxide rich flue gas generated in a boiler combusting a fuel in the presence of a gas containing oxygen gas, the method comprising compressing the carbon dioxide rich flue gas, cooling the compressed carbon dioxide rich flue gas to a first temperature, forwarding the cooled compressed carbon dioxide rich flue gas through a mercury adsorber to remove at least a portion of a mercury content of the cooled compressed carbon dioxide rich flue gas, further cooling the compressed carbon dioxide rich flue gas to a second temperature, which is lower than the first temperature, and forwarding the further cooled compressed carbon dioxide rich flue gas through a drier to remove at least a portion of a water content of the further cooled compressed carbon dioxide rich flue gas.

An advantage of this method is that both the mercury adsorption and the removal of water vapour may be achieved at effective temperatures for the respective operation. Furthermore, there is no need for heating the gas between the two operations, thus reducing the power consumption.

According to one embodiment the step of cooling the compressed carbon dioxide rich flue gas to a first temperature comprises cooling to a first temperature being higher than the dew point temperature with respect to water vapour of the compressed carbon dioxide rich flue gas. An advantage of this embodiment is that condensation of water vapour in the mercury adsorber is avoided. Such condensation could be detrimental to the efficiency and life of the mercury adsorber and the active materials used therein.

According to one embodiment the step of cooling the gas to a first temperature comprises cooling the gas to a first temperature being 5 to 30° C. higher than the dew point temperature with respect to water vapour of the compressed carbon dioxide rich flue gas. Cooling to a temperature of less than 5° C. above the dew point temperature is less attractive, since the risk of water vapour condensation increases. Cooling to a temperature of more than 30° C. above the dew point temperature is also less attractive, since the efficiency of mercury adsorption decreases.

According to one embodiment the step of further cooling the compressed carbon dioxide rich flue gas to a second temperature, which is lower than the first temperature, comprises cooling to a second temperature being lower than the dew point temperature with respect to water vapour of the compressed carbon dioxide rich flue gas. An advantage of this embodiment is that some condensation of water vapour occurs, which increases the efficiency of the downstream drier.

According to one embodiment the step of further cooling the compressed carbon dioxide rich flue gas comprises cooling to a second temperature being 0 to 40° C. higher than the carbon dioxide hydrate formation temperature of the compressed carbon dioxide rich flue gas. Cooling to a temperature which is lower than the carbon dioxide hydrate formation temperature is less attractive, since formation of solid carbon dioxide hydrate may be detrimental to the operation of a cooler in which the step of further cooling the compressed carbon dioxide rich flue gas is performed. Cooling to a temperature of more than 40° C. above the carbon dioxide hydrate formation temperature is also less attractive, since the efficiency of water vapour adsorption in the gas drier becomes less efficient, resulting in a need for an unnecessarily large and expensive drier.

According to one embodiment the step of compressing the carbon dioxide rich flue gas involves heating, by means of the compression of the gas, the compressed carbon dioxide rich flue gas to a temperature which is higher than the first temperature. An advantage of this embodiment is that the heat of compression is utilized for obtaining a starting temperature, from which the gas can be cooled to the first and second temperatures. Hence, no additional heating is needed during normal operation.

According to one embodiment, the compression of the carbon dioxide rich flue gas involves heating, by means of the compression of the gas, the compressed carbon dioxide rich flue gas to a temperature of 60 to 270° C. An advantage of this embodiment is that a temperature of 60 to 270° C. is often attainable as a result of compression by a compressor working efficiently to compress the carbon dioxide rich flue gas. A temperature of less than 60° C. after compression often means that the compression has resulted in a rather low pressure of the compressed gas. Hence, more compression stages would be needed. A temperature of more than 270° C. after compression often means that compression has been less energy efficient, resulting in excessive heat losses.

A further object of the present invention is to provide a purification system for cleaning a carbon dioxide rich flue gas generated in a boiler combusting a fuel in the presence of a gas containing oxygen gas, the purification system being more efficient than the prior art systems.

This object is achieved by means of a gas purification system for cleaning a carbon dioxide rich flue gas generated in a boiler combusting a fuel in the presence of a gas containing oxygen gas, the gas purification system comprising:

a compressor for compressing the carbon dioxide rich flue gas, a first gas cooler arranged downstream, as seen in the direction flow of the carbon dioxide rich flue gas, of the compressor for cooling the compressed carbon dioxide rich flue gas, a mercury adsorber arranged downstream of the first gas cooler for removing at least a portion of a mercury content of the cooled compressed carbon dioxide rich flue gas, a second gas cooler arranged downstream of the mercury adsorber for further cooling the compressed carbon dioxide rich flue gas, and a gas drier arranged downstream of the second gas cooler for removing at least a portion of a water content of the further cooled compressed carbon dioxide rich flue gas.

An advantage of this purification system is that it is very efficient with regard to investment and operating costs. It is not necessary to include a separate heater, and heating power requirements are limited.

According to one embodiment the purification system further comprises a control system comprising a sensor measuring the temperature of the cooled compressed carbon dioxide rich flue gas downstream of the first gas cooler, the control system further comprising a control device controlling the first gas cooler in view of the measured temperature. An advantage of this embodiment is that it becomes possible to control very accurately the operating temperature of the mercury adsorber.

According to one embodiment the purification system comprises a water trap arranged between the second gas cooler and the gas drier for collecting liquid water from the further cooled compressed carbon dioxide rich flue gas. An advantage of this embodiment is that the water load on the gas drier can be reduced. Hence, the gas drier size can be minimized, still providing the same residual water content in the carbon dioxide rich flue gas leaving the gas drier.

According to one embodiment the gas purification system comprises a heating system for forwarding a heated gas through the mercury adsorber prior to start-up of the gas purification system. An advantage of this embodiment is that the risk of condensation of water vapour inside the mercury adsorber during start-up is reduced.

Further objects and features of the present invention will be apparent from the description and the claims.

BRIEF DESCRIPTION OF THE DRAWINGS

The invention will now be described in more detail with reference to the appended drawings in which.

DETAILED DESCRIPTION

Figure 1:
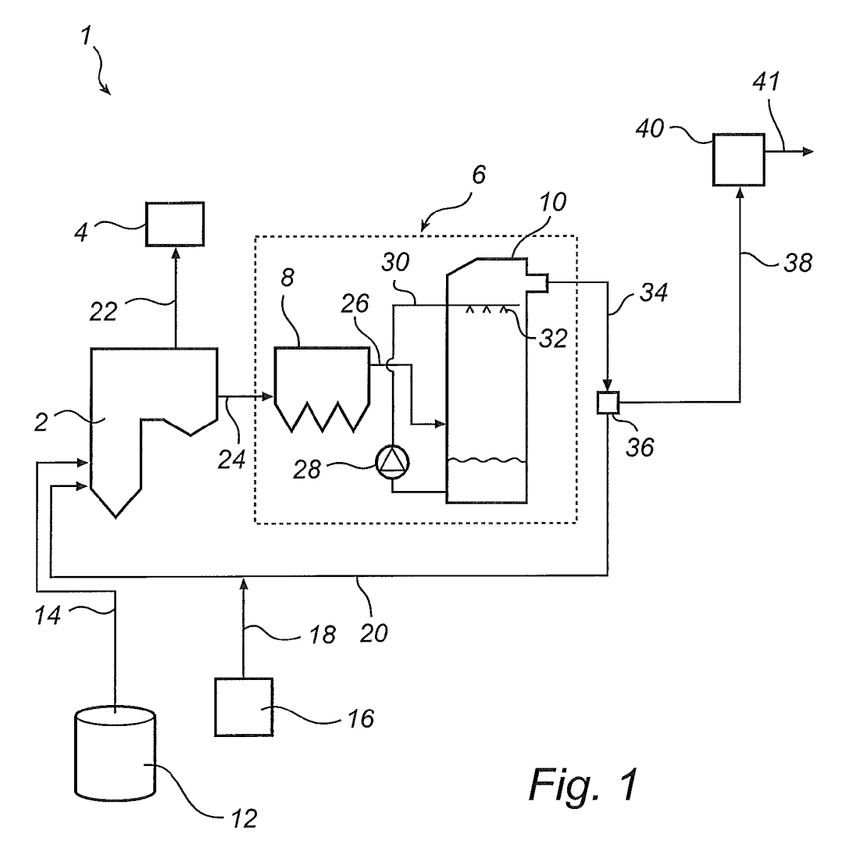
FIG. 1 is a schematic side view of a boiler system.

FIG. 1 is a schematic representation of a boiler system 1, as seen from the side thereof. The boiler system 1 comprises, as main components, a boiler 2, being in this embodiment an oxy-fuel boiler, a steam turbine electric power generation system, schematically indicated as 4, and a gas cleaning system 6. The gas cleaning system 6 comprises a particulate removal device, which may, for example, be a fabric filter or an electrostatic precipitator 8, and a sulphur dioxide removal system, which may be a wet scrubber 10.

A fuel, such as coal, oil, or peat, is contained in a fuel storage 12, and can be supplied to the boiler 2 via a supply pipe 14. An oxygen gas source 16 is operative for providing oxygen gas in a manner which is known per se. The oxygen gas source 16 may be an air separation plant operative for separating oxygen gas from air, an oxygen separating membrane, a storage tank, or any other source for providing oxygen gas to the boiler system 1. A supply duct 18 is operative for forwarding the produced oxygen gas, comprising typically 90-99.9 vol. % oxygen, $O_2$, to the boiler 2. A duct 20 is operative for forwarding recirculated flue gas, which contains carbon dioxide, to the boiler 2. As indicated in FIG. 1, the supply duct 18 joins the duct 20 upstream of the boiler 2, such that oxygen gas and recirculated flue gas, which contains carbon dioxide, may become mixed with each other to form a gas mixture containing typically about 20-50% by volume of oxygen gas, the balance being mainly carbon dioxide and water vapour, upstream of the boiler 2. Since almost no air enters the boiler 2 there is almost no nitrogen gas supplied to the boiler 2. In practical operation, less than 3% by volume of the gas volume supplied to the boiler 2 is air, which mainly enters the boiler system 1 as a leakage of air via, for example, the boiler 2 and the gas cleaning system 6. The boiler 2 is operative for combusting the fuel, that is to be supplied via the supply pipe 14, in the presence of the oxygen gas, mixed with the recirculated flue gas, which contains carbon dioxide, that is to be supplied via the duct 20. A steam pipe 22 is operative for forwarding steam, that will be produced in the boiler 2 as a result of the combustion, to the steam turbine electric power generation system 4, which is operative for generating power in the form of electric power.

A duct 24 is operative for forwarding carbon dioxide rich flue gas generated in the boiler 2 to the dust removal device 8. By "carbon dioxide rich flue gas" is meant that the flue gas leaving the boiler 2 via the duct 24 will contain at least 40% by volume of carbon dioxide, $CO_2$. Often more than 50% by volume of the flue gas leaving the boiler 2 will be carbon dioxide. Typically, the flue gas leaving boiler 2 will contain 50-80% by volume of carbon dioxide. The balance of the "carbon dioxide rich flue gas" will be about 15-40% by volume of water vapour ($H_2O$), 2-7% by volume of oxygen ($O_2$), since a slight oxygen excess is often preferred in the boiler 2, and totally about 0-10% by volume of other gases, including mainly nitrogen ($N_2$) and argon (Ar), since some leakage of air can seldom be completely avoided.

The carbon dioxide rich flue gas generated in the boiler 2 may typically comprise contaminants in the form of, for example, dust particles, hydrochloric acid, HCl, sulphur oxides, $SO_x$, and heavy metals, including mercury, Hg, that should be removed, at least partly, from the carbon dioxide rich flue gas prior to disposing of the carbon dioxide.

The dust removal device 8 removes most of the dust particles from the carbon dioxide rich flue gas. A duct 26 is operative for forwarding the carbon dioxide rich flue gas from the fabric filter 8 to the wet scrubber 10 of the gas cleaning system 6. The wet scrubber 10 comprises a circulation pump 28 which is operative for circulating, in a slurry circulation pipe 30, an absorption liquid, comprising for example lime stone, from the bottom of the wet scrubber 10 to a set of nozzles 32 arranged in the upper portion of the wet scrubber 10. The slurry nozzles 32 are operative for finely distributing the absorption liquid in the wet scrubber 10 to achieve good contact between the absorption liquid and the flue gas being forwarded to the wet scrubber 10 via the duct 26 and flowing substantially vertically upwards inside the wet scrubber 10 to effect efficient removal of sulphur dioxide, $SO_2$, and other acid gases from the carbon dioxide rich flue gas.

An at least partly cleaned carbon dioxide rich flue gas leaves the wet scrubber 10 via a duct 34 which forwards the flue gas to a gas splitting point 36, where the at least partly cleaned carbon dioxide rich flue gas is divided into two flows, namely a first flow, which via the duct 20 is recirculated back to the boiler 2, and a second flow, which via a duct 38 is forwarded to a gas purification system in the form of a gas compression and purification unit (GPU) 40 of the boiler system 1. In the GPU 40 the cleaned carbon dioxide rich flue gas is further cleaned and is compressed for disposal. Compressed carbon dioxide hence leaves the GPU 40 via a duct 41 and is transported away for disposal, which is sometimes referred to as "$CO_2$ sequestration". The first flow, which is recirculated back to the boiler 2 via duct 20, typically comprises 50-75% by volume of the total flow of the partly cleaned carbon dioxide rich flue gas leaving the wet scrubber 10. The second flow, typically comprising 25-50% by volume of the total flow of the partly cleaned carbon dioxide rich flue gas leaving the wet scrubber 10, is, hence, forwarded, via the duct 38, to the GPU 40, which will be described in more detail hereinafter.

Figure 2:
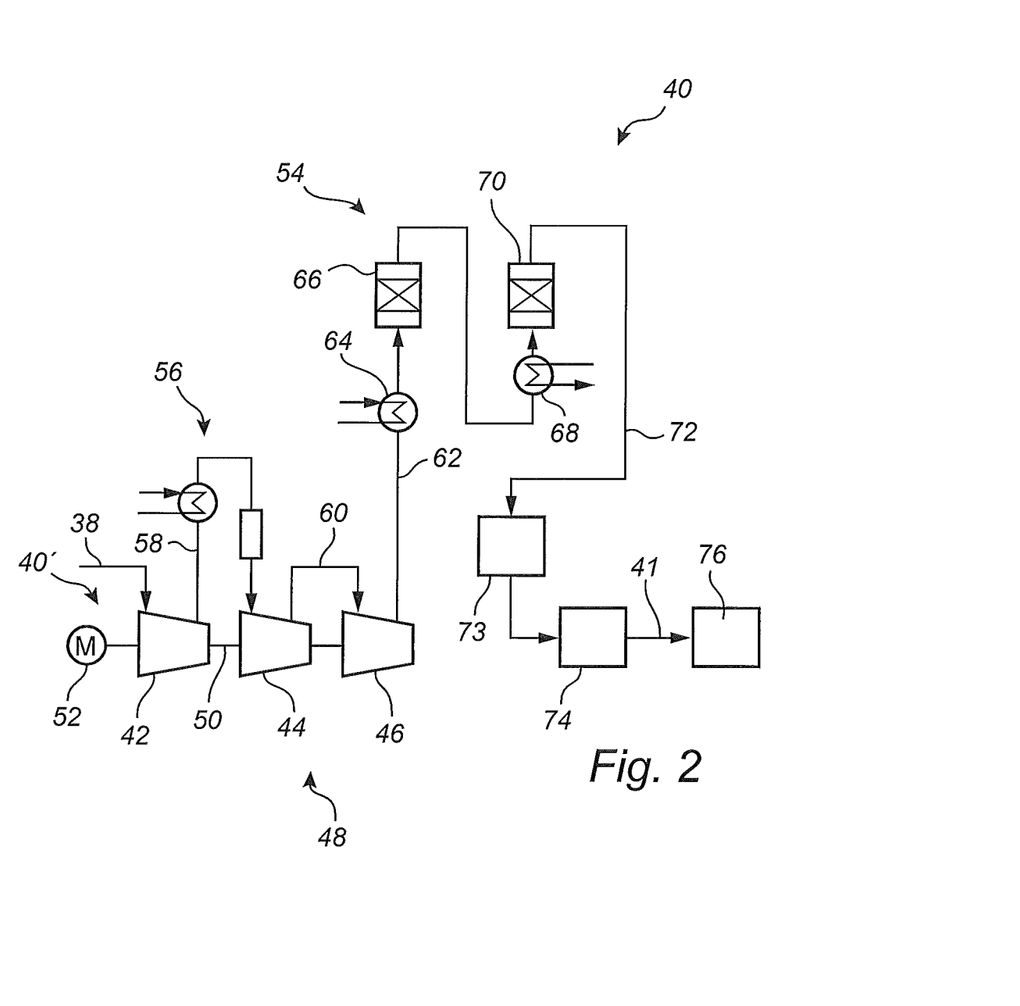
FIG. 2 is a schematic side view of a gas compression and purification unit.

FIG. 2 illustrates the GPU 40 in more detail. It will be appreciated that the illustration of FIG. 2 is schematic, and that a GPU may comprise further devices for gas purification etc.

The GPU 40 comprises at least one compressor having at least one, and typically two to ten compression stages for compressing the cleaned carbon dioxide rich flue gas. Each compression stage could be arranged as a separate unit. As alternative, and as illustrated in FIG. 2, several compression stages could be operated by a common drive. The GPU 40 of FIG. 2 comprises a compressor 40' having a first compression stage 42, a second compression stage 44, and a third compression stage 46. The first to third compression stages 42, 44, 46 form together a low pressure compression unit 48 of the GPU 40. The compression stages 42, 44, 46 are connected to a common drive shaft 50 which is driven by a motor 52 of the compressor 40'.

The GPU 40 comprises at least one gas purification system inter-cooling and mercury adsorption unit 54 which is arranged downstream of one of the compression stages 42, 44, 46. In the embodiment of FIG. 2, the inter-cooling and mercury adsorption unit 54 is arranged downstream of the third compression stage 46, i.e., downstream of the low pressure compression unit 48. It will be appreciated that the inter-cooling and mercury adsorption unit 54 could also have been arranged downstream of the first compression stage 42, or downstream of the second compression stage 44. It is also possible to arrange more than one inter-cooling and mercury adsorption unit 54 in the GPU, for example one inter-cooling and mercury adsorption unit downstream of the second compression stage 44, and one inter-cooling and mercury adsorption unit 54 downstream of the third compression stage 46. Still further, it is also possible to arrange an intercooling unit 56, having the intercooling functionality of the inter-cooling and mercury adsorption unit 54 but lacking the mercury adsorption functionality thereof, downstream of some, or all, of those compression stages that have no inter-cooling and mercury adsorption unit 54 arranged downstream thereof. Hence, intercooling units 56 may be arranged downstream of the first, and second compression stages 42, and 44 of the GPU 40 of FIG. 2. One such optional intercooling unit 56 is illustrated downstream of the first compression stage 42.

The cleaned carbon dioxide rich flue gas enters the GPU 40 via the duct 38 and is introduced into the first compression stage 42. A duct 58 forwards, optionally via the intercooling unit 56, the compressed gas from the first compression stage 42 to the second compression stage 44. A duct 60 forwards, optionally via a not shown intercooling unit, the compressed gas from the second compression stage 44 to the third compression stage 46. A duct 62 forwards the compressed gas from the third compression stage 46 to the inter-cooling and mercury adsorption unit 54.

The main parts of the inter-cooling and mercury adsorption unit 54 are a first gas cooler 64, a mercury adsorber 66, a second gas cooler 68, and a gas drier 70. The mercury adsorber 66 is operative for removing at least a portion of the mercury content of the compressed gas. The gas drier 70 serves to remove at least a portion of the content of water vapour of the compressed gas. The parts of the inter-cooling and mercury adsorption unit 54 will be described in more detail hereinafter with reference to FIG. 3.

A duct 72 forwards the compressed gas, from which at least a portion of its mercury and water vapour content has been removed, from the inter-cooling and mercury adsorption unit 54 to optional further units of the GPU 40. Examples of such optional further units of the GPU 40 include a non-condensable gas removal unit, for example a $CO_2$ liquefaction unit 73, in which the gas is cooled in a heat-exchanger, often called a cold-box, to cause liquefaction of the carbon dioxide such that the carbon dioxide can be separated from gases, such as nitrogen, that are not liquefied at the same temperature as carbon dioxide. Furthermore, the GPU 40 may comprise a high pressure compression unit 74 arranged downstream, as seen with respect to the transport direction of the carbon dioxide, of the $CO_2$ liquefaction unit 73, and comprising one or more compression stages for compressing the carbon dioxide to a suitable pressure for sequestration. After compression of the gas in the high pressure compression unit 74, the compressed carbon dioxide, which may be in a supercritical or liquid state, is forwarded, via duct 41, to a $CO_2$ sequestration site 76.

Figure 3:
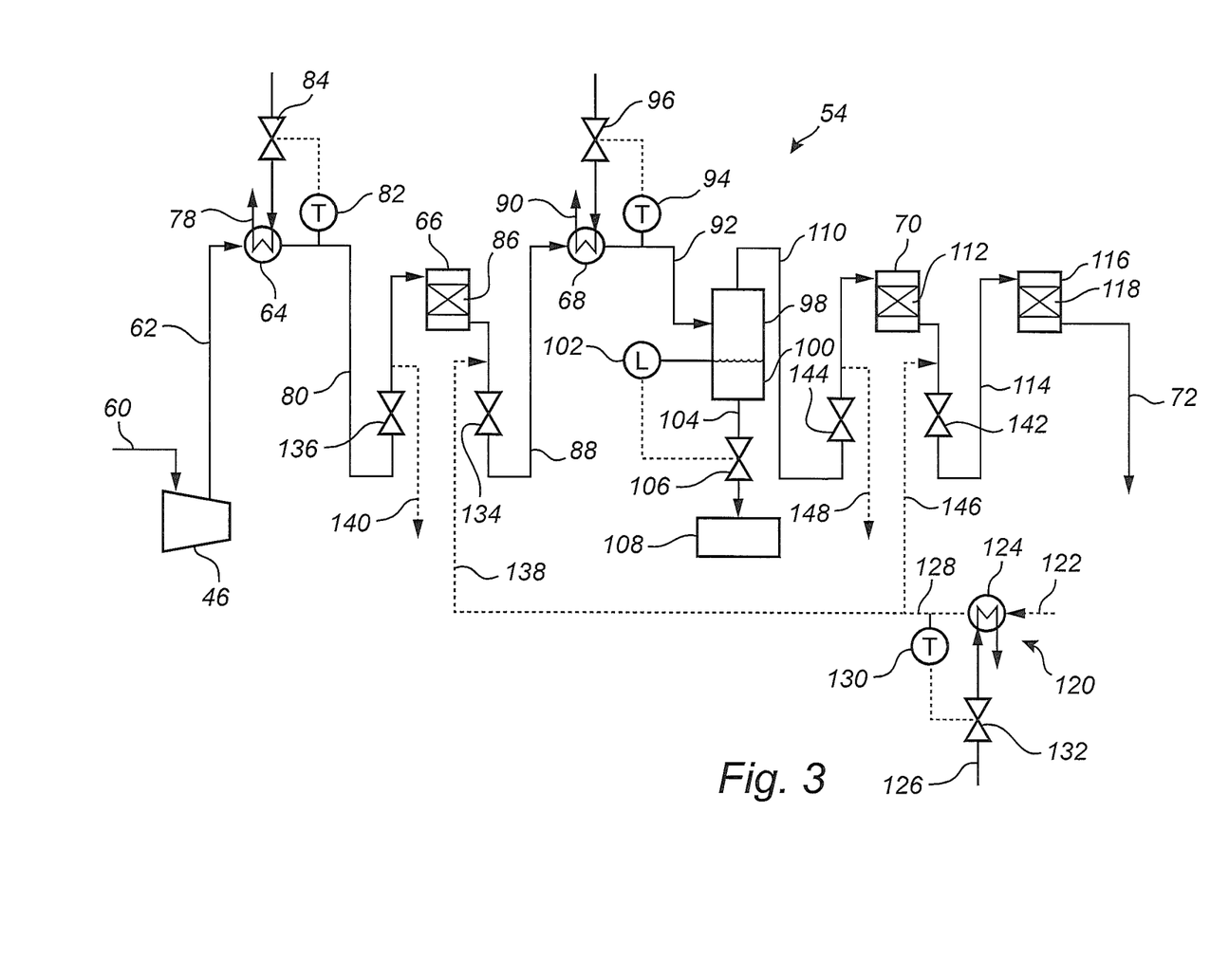
FIG. 3 is schematic side view of an inter-cooling and mercury adsorption unit.

FIG. 3 describes the inter-cooling and mercury adsorption unit 54 in more detail. The carbon dioxide rich flue gas compressed in the third compression stage 46 enters the inter-cooling and mercury adsorption unit 54 via the fluidly connected duct 62. The compressed carbon dioxide rich flue gas may, just downstream of the third compression stage 46, have a pressure of 10-60 bar absolute pressure, and, typically, a temperature of 60 to 270° C., which is a starting temperature of that gas on which the inter-cooling and mercury adsorption unit 54 is to perform its operations. In one example, the compressed carbon dioxide rich flue gas leaving the third compression stage 46 may have a starting temperature of 120° C. and a pressure of 35 bar absolute pressure.

The compressed carbon dioxide rich flue gas enters, via fluidly connected duct 62, the first gas cooler 64. A cooling medium circuit 78 is connected to the first gas cooler 64 for circulating a cooling medium, such as cooling air, cooling water, cooling oil, or another suitable coolant, in the first gas cooler 64. As a further alternative, the first gas cooler 64 could be air-cooled. The cooled compressed carbon dioxide rich flue gas leaves the first gas cooler 64 via fluidly connected duct 80. A temperature sensor 82 is arranged in the duct 80 to measure the temperature of the cooled compressed carbon dioxide rich flue gas. A damper or valve 84 is arranged in the cooling liquid circuit 78 for controlling the flow of cooling medium to the first gas cooler 64. The temperature sensor 82 controls the valve 84 to supply a suitable amount of cooling medium. Typically, the temperature sensor 82 controls the flow of cooling medium to the first gas cooler 64 to obtain a cooled compressed carbon dioxide rich flue gas having a first temperature which is 5 to 30° C. above the dew point temperature with respect to water of the compressed carbon dioxide rich flue gas. The dew point temperature is that temperature of a gas mixture at which water vapour starts to condense into liquid water. Liquid water would be detrimental to the function of the downstream mercury adsorber 66, and, hence, the cooled compressed carbon dioxide rich flue gas is preferably cooled to a first temperature which is above the dew point temperature. The mercury adsorber 66 tends to operate more efficiently the lower the temperature, and, hence, it is preferable to cool to a first temperature which is no more than 30° C. above the dew point temperature with respect to water of the cooled compressed carbon dioxide rich flue gas. In one example, the cooled compressed carbon dioxide rich flue gas leaving the first gas cooler 64 has a first temperature of 60° C., a temperature which is 10° C. above the dew point temperature with respect to water of 50° C. of the cooled compressed carbon dioxide rich flue gas in question.

The cooled compressed carbon dioxide rich flue gas is forwarded via fluidly connected duct 80 to the mercury adsorber 66. The mercury adsorber 66 is provided with a packing 86 comprising a mercury adsorbent having affinity for mercury. The adsorbent may, for example, be activated carbon impregnated with sulphur, or another material that is, as such, known for its affinity for mercury. Hence, as the cooled compressed carbon dioxide rich flue gas passes through the packing 86, at least a portion of the content of mercury of the gas will be adsorbed on the mercury adsorbent of the packing 86.

The cooled compressed carbon dioxide rich flue gas, from which at least a portion of its mercury content has been removed, is forwarded, via fluidly connected duct 88, to the second gas cooler 68. Typically, there would be no compressor or other gas heating device arranged between the mercury adsorber 66 and the second gas cooler 68. A cooling liquid circuit 90 is connected to the second gas cooler 68 for circulating a cooling medium, such as a glycol-water mixture, an ammonia-water mixture, an organic refrigerant, or another suitable coolant, in the second gas cooler 68. The coolant of the cooling liquid circuit 90 has a lower temperature than the cooled compressed carbon dioxide rich flue gas. Hence, a further cooling of the cooled compressed carbon dioxide rich flue gas is accomplished in the second gas cooler 68. The further cooled compressed carbon dioxide rich flue gas leaves the second gas cooler 68 via fluidly connected duct 92. A temperature sensor 94 is arranged in the duct 92 to measure the temperature of the further cooled compressed carbon dioxide rich flue gas. A valve 96 is arranged in the cooling liquid circuit 90 for controlling the flow of coolant to the second gas cooler 68. The temperature sensor 94 controls the valve 96 to supply a suitable amount of coolant. Typically, the temperature sensor 94 controls the flow of coolant to the second gas cooler 68 to obtain a further cooled compressed carbon dioxide rich flue gas having a second temperature, which is lower than the above-mentioned first temperature, and which is 0 to 40° C. above the carbon dioxide hydrate formation temperature of the compressed carbon dioxide rich flue gas. The carbon dioxide hydrate formation temperature is that temperature of a gas mixture comprising carbon dioxide and water vapour at which a solid hydrate of carbon dioxide and water starts to form, see for example Tamman, G. & Krige, G. J. (1925): "*Equilibrium pressures of gas hydrates*." Zeit. Anorg. and Algem. Chem., 146, pp. 179-195. Formation of solid carbon dioxide hydrates would be detrimental to the function of the second gas cooler 68, and, hence, the further cooled compressed carbon dioxide rich flue gas is preferably cooled to a second temperature which is above the carbon dioxide hydrate formation temperature. More preferably, the further cooled compressed carbon dioxide rich flue gas is cooled to a second temperature which is above the carbon dioxide hydrate formation temperature, and which is below the dew point temperature with respect to water of the carbon dioxide rich flue gas. By causing a condensation of some of the water vapour, and preferably removing liquid formed thereby in a gas-liquid separator as described hereinafter, the residual water vapour load that has to be removed by the gas drier 70 is reduced. The residual water vapor load that has to be removed by the gas drier 70 is further reduced the lower the temperature, resulting in smaller drier equipment. Hence, it is preferable to cool to a second temperature which is no more than 40° C. above the carbon dioxide hydrate formation temperature of the further cooled compressed carbon dioxide rich flue gas. In one example, the further cooled compressed carbon dioxide rich flue gas has a second temperature of 15° C., a temperature which is 9° C. above the carbon dioxide hydrate formation temperature of 6° C. of the further cooled compressed carbon dioxide rich flue gas in question.

The further cooled compressed carbon dioxide rich flue gas is forwarded via fluidly connected duct 92 to an optional gas-liquid separator 98. The gas-liquid separator 98 separates water droplets, generated as an effect of condensation caused by the further cooling of the gas in the second gas cooler 68, from the remaining gas. The water droplets are collected in a lower portion 100 of the gas-liquid separator 98. A level meter 102 measures the amount of liquid in the gas-liquid separator 98. A drain pipe 104 arranged in the lower portion 100 of the gas-liquid separator 98 is provided with a valve 106. The level meter 102 controls the valve 106, and orders the valve 106 to open when the level of liquid in the gas-liquid separator 98 is too high. When the valve 106 is opened liquid drains from the gas-liquid separator 98 to a water treatment plant 108 via the drain pipe 104.

The further cooled compressed carbon dioxide rich flue gas is forwarded further from the gas-liquid separator 98 to the gas drier 70 via a fluidly connected duct 110. The gas drier 70 is provided with a packing 112 comprising a water vapour adsorbent, also referred to as a desiccant, having affinity for water vapour. The desiccant may, for example, be silica gel, calcium sulphate, calcium chloride, montmorillonite clay, molecular sieves, or another material that is, as such, known for its use as a desiccant. Hence, as the further cooled compressed carbon dioxide rich flue gas passes through the packing 112, at least a portion of the content of water vapour of the gas will be adsorbed on the desiccant of the packing 112.

The further cooled compressed carbon dioxide rich flue gas, from which at least a portion of its water vapour content has been removed, is forwarded, via fluidly connected duct 114, to an optional filter 116. The filter 116 is provided with a filtering insert 118, which may have the form of fabric bags, metal filter nets, ceramic tubes, and other devices that are per se known for efficient removal of solid particles from a gas. Such particles could, for example, originate from the adsorbent material of the packing 86 of the mercury adsorber 66, and/or from the desiccant of the packing 112 of the gas drier 70. Particulate material may cause wear to compression stages or blocking of the $CO_2$ liquefaction unit, and, hence, it may be suitable to remove any particulate material from the gas by means of the filter 116 before forwarding the gas to the $CO_2$ liquefaction unit 73 and the high pressure compression unit 74, illustrated in FIG. 2, via the fluidly connected duct 72.

In one example, the further cooled compressed carbon dioxide rich flue gas leaving the inter-cooling and mercury adsorption unit 54 via the duct 72 has a temperature of 15° C., and an absolute pressure of just below 30 bar absolute pressure, since a slight pressure drop is normal as the gas passes through the unit 54. The gas also has a reduced content of mercury and water vapour. Such a gas is suitable for further treatment in the $CO_2$ liquefaction unit 73 and the high pressure compression unit 74, and for eventually being sent to carbon dioxide sequestration 76 via duct 41, as illustrated in FIG. 2. For example, a heat exchanger, also called a cold box, of the $CO_2$ liquefaction unit 73 may often be made from aluminium. Aluminium may react with mercury in an unwanted manner. By removing mercury from the carbon dioxide rich flue gas in the adsorber 66, upstream of the $CO_2$ liquefaction unit 73, such problems are avoided, or at least minimized. Furthermore, in some cases it is also necessary to remove mercury from the carbon dioxide to meet the specification required for the $CO_2$ sequestration 76.

Returning to FIG. 3, the inter-cooling and mercury adsorption unit 54 is provided with a regeneration and heating system 120 for intermittent regeneration of the water vapour adsorption capacity of the gas drier 70. The regeneration and heating system 120 is also utilized for pre-heating of the mercury adsorber 66 at start-up. A supply duct 122 is arranged for supplying a regeneration gas to the system 120. The regeneration gas is preferably an inert gas which does not react with the packings 86 and 112. Examples of suitable gases include nitrogen, clean carbon dioxide, coming for example from the duct 41, or another inert gas that, preferably, holds a low amount of mercury and water vapour. Preferably, inert off gas, usually comprising nitrogen as one of its main constituents, separated from the carbon dioxide in the $CO_2$ liquefaction unit 73 is utilized as regeneration gas. The regeneration system 120 comprises a heater 124 which is adapted for heating the regeneration gas. A heating circuit 126 is connected to the heater 124 for circulating a heating medium, such as steam, in the heater 124. The heated regeneration gas leaves the heater 124 via fluidly connected duct 128. A temperature sensor 130 is arranged in the duct 128 to measure the temperature of the heated regeneration gas. A valve 132 is arranged in the heating circuit 126 for controlling the flow of heating medium to the heater 124. The temperature sensor 130 controls the valve 132 to supply a suitable amount of heating medium. For pre-heating of the material of the packing 86 of the mercury adsorber 66 at start-up, the heater 124 may typically heat the regeneration gas to a temperature of about 40-80° C. For regeneration of the material of the packing 112 of the gas drier 70, the heater 124 may typically heat the regeneration gas to a temperature of about 120-300° C.

Mercury adsorber isolation valves 134, 136 are arranged on the ducts 88, 80, respectively. During a pre-heating sequence, the valves 134, 136 are shut to isolate the mercury adsorber 66, and heated regeneration gas is supplied to the mercury adsorber 66 from the regeneration and heating system 120 via a duct 138 which is fluidly connected to the duct 128. The regeneration gas heats the material of the packing 86. The mercury is firmly bound to the material of the packing 86, which means that no, or almost no, mercury is released from the packing 86 during the pre-heating thereof. Spent regeneration gas leaves the mercury adsorber 66 via a duct 140. The spent regeneration gas, containing no, or a very low concentration of mercury, may be released to the atmosphere.

When the packing 86 has adsorbed mercury in accordance with its adsorption capacity, the valves 134, 136 are closed and the spent packing 86 is replaced with fresh packing 86.

Gas drier isolation valves 142, 144 are arranged on the ducts 114, 110 respectively. During a regeneration sequence, the valves 142, 144 are shut to isolate the gas drier 70, and heated regeneration gas is supplied to the gas drier 70 from the regeneration and heating system 120 via a duct 146 which is fluidly connected to the duct 128. The regeneration gas heats the material of the packing 112 and causes a desorption of water vapour. Spent regeneration gas, containing desorbed water vapour, leaves the gas drier 70 via a duct 148. Since the mercury adsorber 66 is installed upstream of the gas drier 70, no mercury, or just a very small amount of mercury, is adsorbed in the material of the packing 112 of the gas drier 70. Thus, no, or almost no, mercury is desorbed during the regeneration of the gas drier 70. The spent regeneration gas coming from the gas drier 70 is very clean with respect to mercury and may, thus, be released to the atmosphere.

It will be appreciated that when the valves 134, 136 are closed, no carbon dioxide rich gas may pass through the mercury adsorber 66. According to one embodiment, the GPU 40 may be provided with two parallel mercury adsorbers 66, with one of those parallel adsorbers 66 being in operation while the other parallel adsorber undergoes replacement of the packing 86. According to another embodiment, the carbon dioxide rich flue gas could be emitted to the atmosphere during the replacement of the packing 86.

It will also be appreciated that when the valves 142, 144 are closed, no carbon dioxide rich gas may pass through the gas drier 70. According to one embodiment, the GPU 40 may be provided with two parallel gas driers 70, with one of those parallel gas driers 70 being in operation while the other parallel gas drier 70 undergoes regeneration. According to another embodiment, the carbon dioxide rich flue gas could be emitted to the atmosphere during the regeneration of the packing 112 of the gas drier 70.

At start-up of a boiler system 1, illustrated in FIG. 1, most parts of the boiler system 1, including most parts of the inter-cooling and mercury adsorption unit 54 are cold, which means that they typically have a temperature of around 0-25° C., depending on the ambient temperature. Such low temperatures pose a risk of the temperature of the gas inside the mercury adsorber 66 getting lower, during the start-up phase, than the dew point temperature with respect to water, which could result in unwanted liquid water condensation inside the packing 86. To avoid such water condensation, the regeneration and heating system 120 is utilized, as mentioned hereinabove, for pre-heating the mercury adsorber 66 prior to the start-up of the GPU 40 being initialized. This pre-heating could be achieved by utilizing the regeneration and heating system 120 for forwarding a heated gas, such as heated nitrogen gas, a heated cleaned carbon dioxide gas, or a heated off gas, for example an off gas containing non-condensable gases such as nitrogen and oxygen, of a temperature of, for example, 40-80° C., to the mercury adsorber 66 via ducts 128 and 138 to achieve a pre-heating of the packing 86, to avoid any formation of water droplets in the packing 86 during the start-up-phase.

Figure 4:
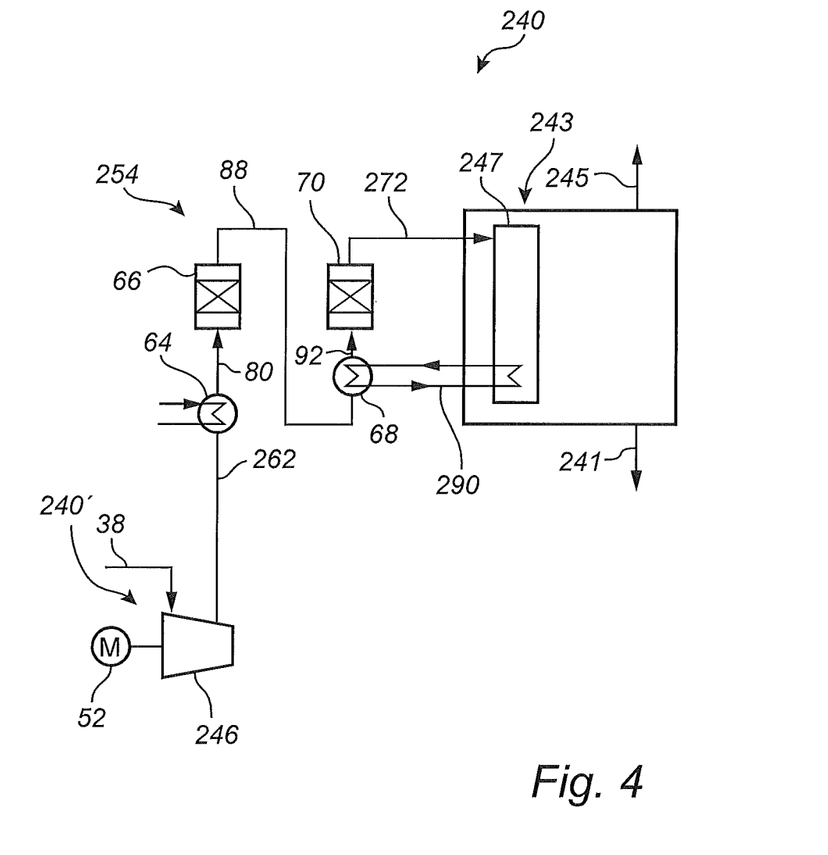
FIG. 4 is a schematic side view of a cryogenic carbon dioxide separation process.

FIG. 4 illustrates a gas purification system in the form of a carbon dioxide separation unit 240 in accordance with an alternative embodiment. Many of the features of carbon dioxide separation unit 240 are similar to the features of gas compression and purification unit 40, and those similar features of FIG. 4 have been given the same reference numerals as those of FIG. 1. The carbon dioxide separation unit 240 differs from the gas compression and purification unit 40 illustrated in FIG. 1 in that carbon dioxide is separated from other gases, such as air and nitrogen, by means of a cryogenic process. In a cryogenic process a carbon dioxide rich flue gas is compressed and cooled to such low temperatures that carbon dioxide is liquefied. Separation from other gases, boiling at lower temperatures than carbon dioxide, and sometimes referred to as "non-condensable gases" may then be achieved. Examples of non-condensable gases include nitrogen, oxygen and argon. Examples of cryogenic processes for carbon dioxide separation and recovery are disclosed in US 2008/0173584 and US 2010/0215566.

Returning to FIG. 4, the carbon dioxide separation unit 240 comprises, as its main units, a gas compressor 240', illustrated with a compression stage 246, an inter-cooling and mercury adsorption unit 254, and a cryogenic separation unit 243. The gas compressor 240' may be rather similar to the compressor 40' described hereinbefore with reference to FIG. 2, and is driven by a motor 52. Compressed gas is forwarded, via a duct 262, to a first gas cooler 64 of the inter-cooling and mercury adsorption unit 254. The first gas cooler 64 cools the gas to a first temperature, in a similar manner as described hereinbefore with reference to FIG. 3, after which the cooled compressed gas is forwarded, via duct 80, to mercury adsorber 66. In mercury adsorber 66 mercury is adsorbed from the gas in a similar manner as described hereinbefore with reference to FIG. 3. The cooled compressed gas is then forwarded, via duct 88, to a second gas cooler 68. The second gas cooler 68 cools the gas further to a second temperature, in a similar manner as described hereinbefore with reference to FIG. 3. The further cooled compressed gas is then forwarded, via duct 92, to a gas drier 70. In gas drier 70 water vapour is adsorbed from the gas in a similar manner as described hereinbefore with reference to FIG. 3. Optionally, the inter-cooling and mercury adsorption unit 254 may further comprise a gas-liquid separator, and/or a filter and/or a regeneration system of the types disclosed in FIG. 3.

The gas leaves gas drier 70 via duct 272 and enters cryogenic separation unit 243. In cryogenic separation unit 243 carbon dioxide is separated from non-condensable gases. Hence, a carbon dioxide rich stream, typically comprising liquefied carbon dioxide, leaves cryogenic separation unit 243 via duct 241 and may be transported away for carbon dioxide sequestration. A stream of non-condensable gases leaves cryogenic separation unit 243 via duct 245 and may be released to the atmosphere.

A cryogenic separation unit 243 may typically comprise a so-called cold box 247. The cold box 247 may be a multi-pass heat exchanger, which may be made from aluminium, in which heating and cooling of various streams of the cryogenic separation unit 243 may be achieved. In accordance with one option, a cooling liquid circuit 290 is connected to the second gas cooler 68 for achieving the cooling of the gas to the second temperature. The cooling liquid circuit 290 could be connected to the cold box 247, as indicated in FIG. 4, to utilize the cooling capacity of the cold box 247 when cooling the coolant circulating in the cooling liquid circuit 290.

Aluminium, which may be included as part of the structure of the cold box 247, may react with mercury in an unwanted manner. By removing mercury from the carbon dioxide rich flue gas in the adsorber 66, upstream of the cold box 247 of the cryogenic separation unit 243, such problems are avoided, or at least minimized. Furthermore, in some cases it is also necessary to remove mercury from the carbon dioxide to meet the specification required for the carbon dioxide sequestration.

It will be appreciated that numerous variants of the embodiments described above are possible within the scope of the appended claims.

Hereinbefore it has been described how a gas purification system including a compressor 40', 240', a first gas cooler 64, a mercury adsorber 66, a second gas cooler 68, and a gas drier 70, may be integrated as part of a GPU 40, as illustrated in FIGS. 2-3, or may be combined with a cryogenic separation unit 243, as illustrated in FIG. 4. It will be appreciated that a gas purification system of this type, and a method of operating it, may also be integrated in other types of processes, where there is a need for removing mercury and water vapour from a carbon dioxide rich flue gas. Furthermore, the gas purification system of the above mentioned type may also be integrated in other parts of the GPU 40 and combined in other manners with the cryogenic separation unit 243 than those described hereinbefore.

To summarize, a gas purification system 40 for cleaning a carbon dioxide rich flue gas generated in a boiler combusting a fuel in the presence of a gas containing oxygen gas comprises:

a compressor 40' for compressing the carbon dioxide rich flue gas, a first gas cooler 64 for cooling the compressed carbon dioxide rich flue gas, a mercury adsorber 66 arranged downstream of the first gas cooler 64 for removing at least a portion of a mercury content of the cooled compressed carbon dioxide rich flue gas, a second gas cooler 68 arranged downstream of the mercury adsorber 66 for further cooling the compressed carbon dioxide rich flue gas, and a gas drier 70 for removing at least a portion of a water content of the further cooled compressed carbon dioxide rich flue gas.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of cleaning a carbon dioxide rich flue gas generated in a boiler combusting a fuel in the presence of a gas containing oxygen gas, the method comprising compressing the carbon dioxide rich flue gas, cooling the compressed carbon dioxide rich flue gas to a
first temperature that is higher than a dew point temperature with respect to water vapour of the compressed carbon dioxide rich flue gas, forwarding the cooled compressed carbon dioxide rich flue gas through a mercury adsorber to remove at least a portion of a mercury content of the cooled compressed carbon dioxide rich flue gas, further cooling the cooled compressed carbon dioxide rich flue gas to a second temperature, which is lower than the first temperature, and forwarding the further cooled compressed carbon dioxide rich flue gas through a drier to remove at least a portion of a water content of the further cooled compressed carbon dioxide rich flue gas.

2. The method according to claim 1, wherein the first temperature is 5° C. to 30° C. higher than the dew point temperature with respect to water vapour of the compressed carbon dioxide rich flue gas.

3. The method according to claim 1, wherein the step of further cooling the compressed carbon dioxide rich flue gas to a second temperature, which is lower than the first temperature, comprises cooling to a second temperature that is lower than the dew point temperature with respect to water vapour of the compressed carbon dioxide rich flue gas.

4. The method according to claim 3, wherein the second temperature is 0° C. to 40° C. higher than the carbon dioxide hydrate formation temperature of the compressed carbon dioxide rich flue gas.

5. The method according to claim 1, wherein the step of compressing the carbon dioxide rich flue gas involves heating, by means of the compression of the gas, the compressed carbon dioxide rich flue gas to a temperature which is higher than the first temperature.

6. The method according to claim 5, further comprising heating, by means of the compression of the gas, the compressed carbon dioxide rich flue gas to a temperature of 60° C. to 270° C.

7. The method of claim 1, wherein the method is performed by a gas purification system that is configured to receive the carbon dioxide rich flue gas from the boiler for cleaning the carbon dioxide rich flue gas, the flue gas from the boiler being generated from the boiler combusting a fuel in the presence of a gas containing oxygen gas, the gas purification system comprising:

a compressor for performing the compressing of the carbon dioxide rich flue gas, a first gas cooler arranged downstream, as seen in a direction of flow of the carbon dioxide rich flue gas, of the compressor for performing the cooling of the compressed carbon dioxide rich flue gas to the first temperature, the mercury adsorber arranged downstream of the first gas cooler that removes the at least a portion of the mercury content of the cooled compressed carbon dioxide rich flue gas, a second gas cooler arranged downstream of the mercury adsorber that performs further cooling of the compressed carbon dioxide rich flue gas, and a gas drier arranged downstream of the second gas cooler that receives the forwarded further cooled compressed carbon dioxide rich flue gas and removes the at least a portion of the water content of the further cooled compressed carbon dioxide rich flue gas.

8. The method of claim 7, wherein the gas purification system further comprises a control system comprising a sensor measuring the temperature of the cooled compressed carbon dioxide rich flue gas downstream of the first gas cooler, the control system further comprising a control device controlling the first gas cooler in view of the measured temperature.

9. The method of claim 7, wherein the gas purification system further comprises a water trap arranged between the second gas cooler and the gas drier for collecting liquid water from the further cooled compressed carbon dioxide rich flue gas.

10. The method of claim 7, wherein the gas purification system further comprises a heating system for forwarding a heated gas through the mercury adsorber prior to start-up of the gas purification system.

11. The method of claim 8, wherein the second gas cooler further cools the compressed carbon dioxide rich flue gas to the second temperature.

12. The method of claim 7, wherein the gas purification system further comprises:

a water trap arranged between the second gas cooler and the gas drier;

a control system comprising a sensor for measuring the temperature of the cooled compressed carbon dioxide rich flue gas downstream of the first gas cooler, the control system further comprising a control device controlling the first gas cooler in view of the measured temperature; and a heating system for forwarding a heated gas through the mercury adsorber prior to start-up of the gas purification system; and the method further comprises:

collecting liquid water from the further cooled compressed carbon dioxide rich flue gas via the water trap;

measuring the temperature of the cooled compressed carbon dioxide rich flue gas downstream of the first gas cooler via the sensor;

controlling the first gas cooler in view of the measured temperature via the control device; and forwarding the heated gas through the mercury adsorber prior to start-up of the gas purification system via the heating system.

* * * * *